United States Patent Office 2,778,914
Patented Jan. 22, 1957

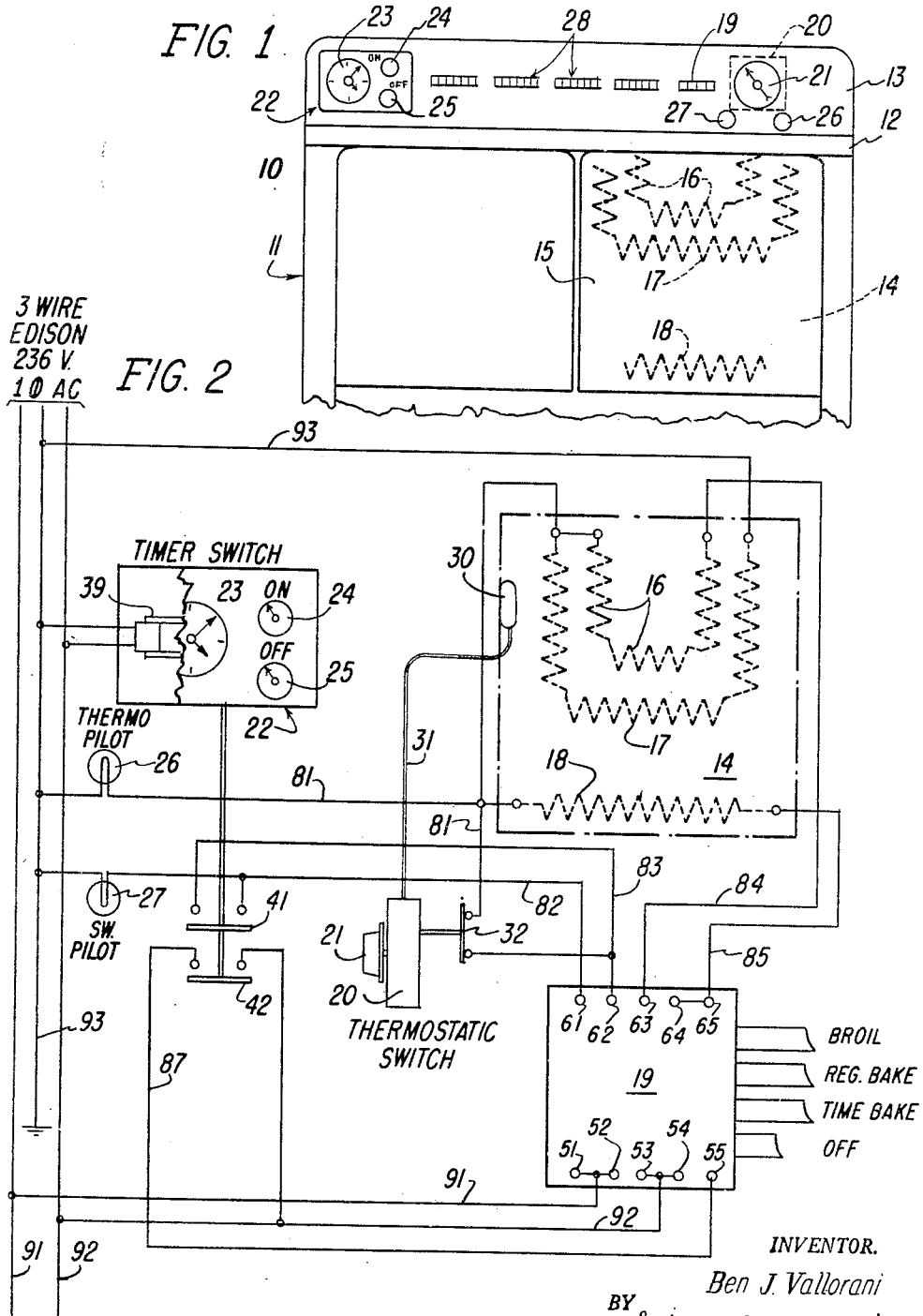

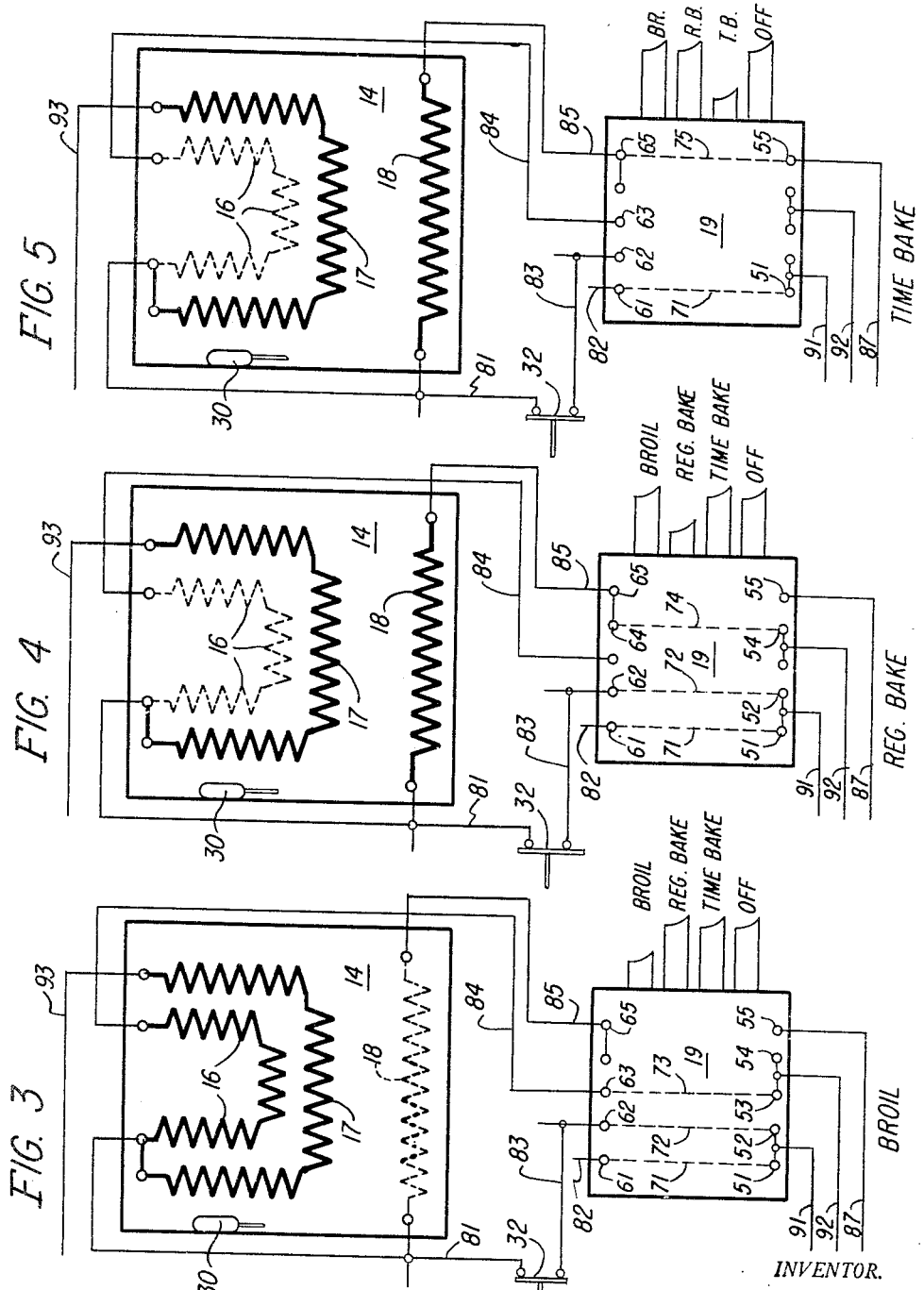

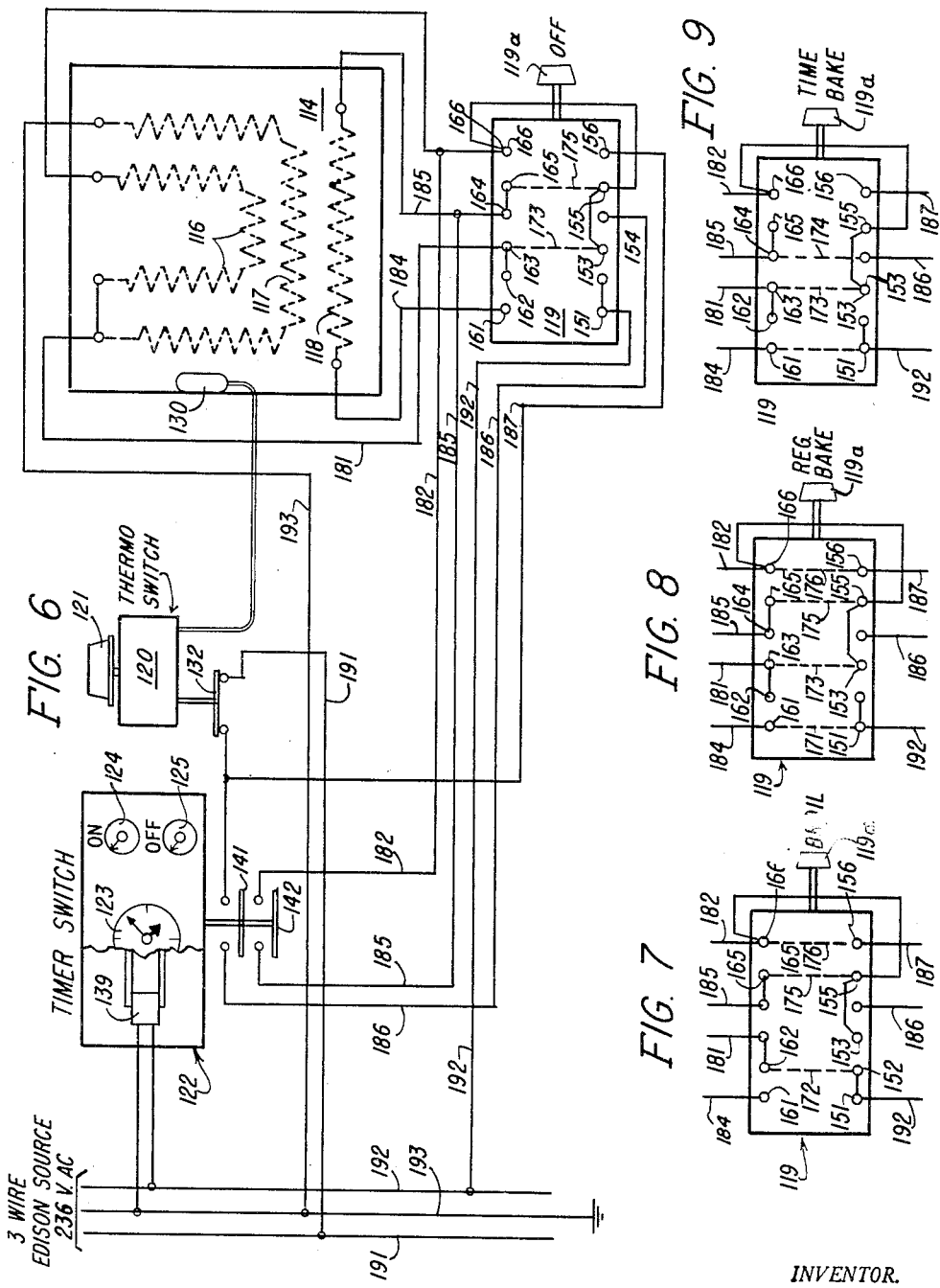

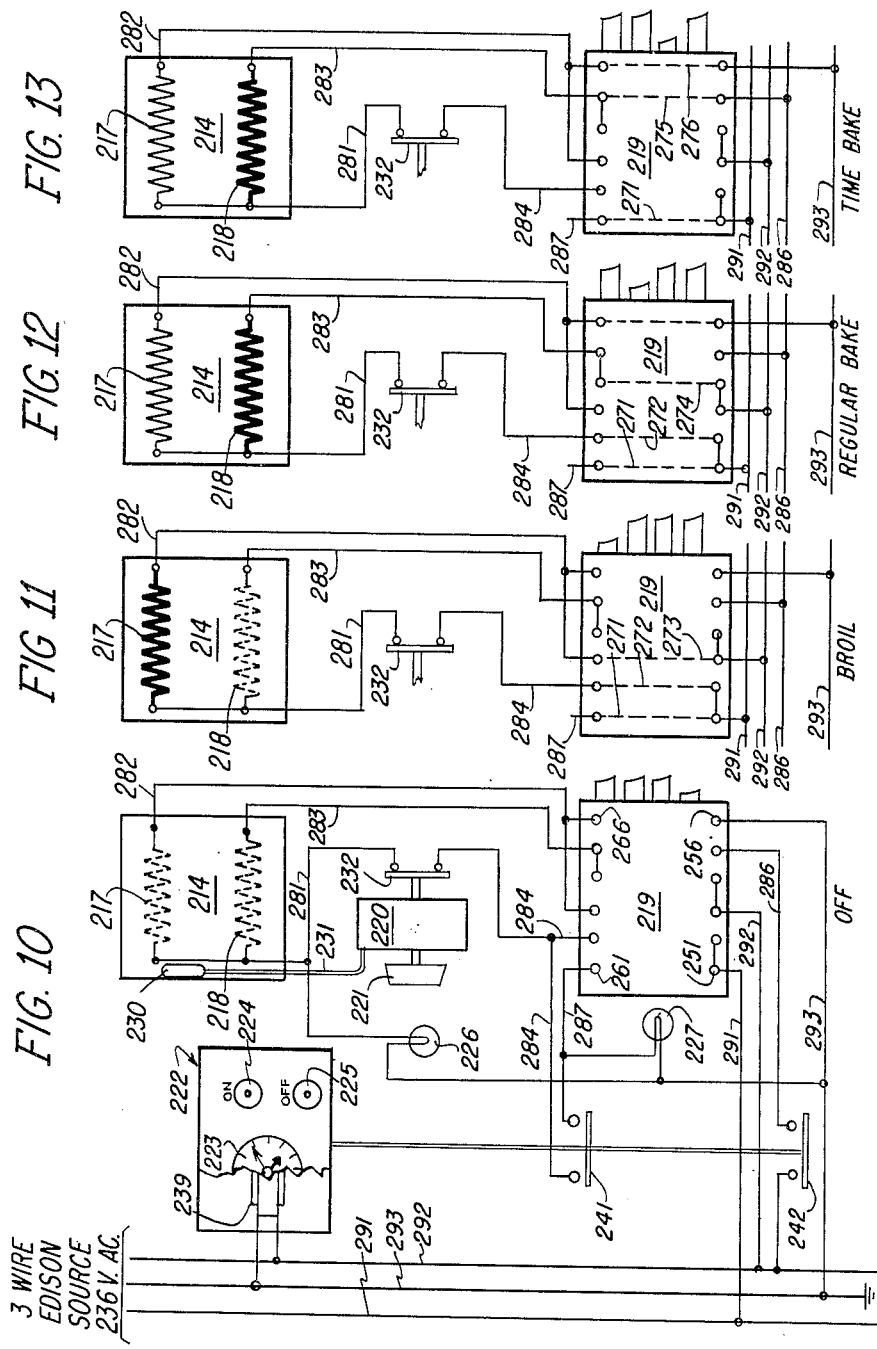

2,778,914

CONTROL CIRCUITS FOR ELECTRIC OVENS

Ben J. Vallorani, River Forest, Ill., assignor to General Electric Company, a corporation of New York Application October 22, 1954, Serial No. 463,957

10 Claims. (Cl. 219—20)

The present invention relates to control circuits for electric ovens, and more particularly to improved control circuits for such ovens provided in electric ranges of the home appliance type.

In a conventional electric range of the home appliance type, there is provided at least one oven comprising upper and lower electric heating elements, a three-wire Edison source of electric current supply, a manually operable control switch selectively operative to establish different electrical heating connections between the heating elements and the source of current supply so as selectively to set the oven to carry out different broiling and baking operations, a manually settable thermostatic switch responsive to the temperature in the oven for selectively completing and interrupting the established heating connections upon a temperature basis in the baking operations of the oven, and a timer switch for selectively completing and interrupting the established heating connections upon a clock-time basis in the baking operations of the oven. In such an oven, the thermostatic switch alternately closes and opens completely the established heating connections upon a temperature basis in the baking operations, whereby there is a considerable amplitude of the temperature variation in the oven cavity and also substantial departure between the amplitude of the temperature variation of the oven cavity and that of the thermal element of the thermostatic switch operatively associated with the oven cavity. Not only are these characteristics objectionable from the standpoints of efficiency and uniformity of operation of the oven, but they are responsible for the objectionable condition of "too much radiation effect" normally present in the upper portions of such conventional ovens. This condition is also referred to as "too much top heat" in oven operation and is exceedingly objectionable in cake-baking operations as it leads directly to lack of uniformity of texture and moisture content in the resulting product.

Accordingly, it is a general object of the invention to provide in an electric oven of the character described, an improved and exceedingly simple control circuit that minimizes the amplitude of temperature variation in the oven cavity and substantially eliminates any departure between the amplitude of the temperature variation of the oven cavity and that of the thermal element of the thermostatic switch operatively associated with the oven cavity, whereby the oven is admirably suited to cake-baking operations.

Another object of the invention is to provide an improved control circuit for an electric oven of the character described, wherein the thermostatic switch is of exceedingly simple construction and arrangement and achieves the improved operating characteristics noted by selectively completing and interrupting a plurality of different heating circuits including the heating elements of the oven in the respective cold and hot positions thereof, so that in the hot position of the thermostatic switch heat is still supplied to the oven cavity, but at a lower rate than when the thermostatic switch is in the cold position thereof.

A further object of the invention is to provide an improved control circuit for an electric oven of the character described, wherein an increased number of different heating circuits for the heating elements is achieved without an increase in the number of heating elements employed, but rather by a higher degree of selectivity of energization of a standard number of heating elements across the various lines of the associated three-wire Edison supply source, whereby a higher degree of utilization of the standard number of heating elements is made than in a conventional electric oven.

A still further object of the invention is to provide in an electric oven of the character described, an improved control circuit, wherein the operating conditions described are achieved not only in manually controlled baking operations, but also in automatic clock-controlled baking operations.

Further features of the invention pertain to the particular arrangement of the elements of the circuit control network, whereby the above-outlined and additional operating features thereof are attained.

The invention, both as to its organization and method of operation, together with further objects and advantages thereof, will best be understood by reference to the following specification taken in connection with the accompanying drawings, in which:

Figure 1 is a fragmentary front view of the upper portion of an electric range incorporating a broiling and baking oven control circuit embodying the present invention;

Fig. 2 is a diagram of the circuit control network incorporated in the range shown in Fig. 1, all of the switches and circuit controls being illustrated in their normal or off positions;

Fig. 3 is a fragmentary portion of the diagram shown in Fig. 2, illustrating the circuit connections when the manual control switch occupies its broil position;

Fig. 4 is another fragmentary portion of the diagram shown in Fig. 2, illustrating the circuit connections when the manual control switch occupies its regular bake position;

Fig. 5 is a further fragmentary portion of the diagram shown in Fig. 2, illustrating the circuit connections when the manual control switch occupies its time bake position;

Fig. 6 is a diagram of a modified form of the circuit control network that may be incorporated in the range shown in Fig. 1, all of the switches and circuit controls benig illustrated in their normal or off positions;

Fig. 7 is a fragmentary portion of the diagram shown in Fig. 6, illustrating the circuit connections when the manual control switch occupies its broil position;

Fig. 8 is another fragmentary portion of the diagram shown in Fig. 6, illustrating the circuit connections when the manual control switch occupies its regular bake position;

Fig. 9 is a further fragmentary portion of the diagram shown in Fig. 6, illustrating the circuit connections when the manual control switch occupies its time bake position;

Fig. 10 is a diagram of another modified form of the circuit control network that may be incorporated in the range shown in Fig. 1, all of the switches and circuit controls being illustrated in their normal or off positions;

Fig. 11 is a fragmentary portion of the diagram shown in Fig. 10, illustrating the circuit connections when the manual control switch occupies its broil position;

Fig. 12 is another fragmentary portion of the diagram shown in Fig. 10, illustrating the circuit connections when the manual control switch occupies its regular bake position; and Fig. 13 is a further fragmentary portion of the diagram shown in Fig. 10, illustrating the circuit connections when the manual control switch occupies its time bake position.

In the diagrams of Figs. 2 to 5, inclusive, and 10 to 13, inclusive, the control circuits embody manually operable control switches of the pushbutton type; and in the diagrams of Figs. 6 to 9, inclusive, the modified form of the control circuit embodies a manually operable control switch of the rotary snap type. In the diagrams of the heating elements appearing in Figs. 2 to 6, inclusive, a broken line indicates that the corresponding heating element is deenergized, and a solid line indicates that the corresponding heating element is energized.

Referring now to Fig. 1 of the drawings, the electric range 10 there illustrated and incorporating the broiling and baking oven control embodying the features of the present invention comprises an upstanding metal body 11 that is provided with a cooking top 12 terminating in an upwardly directed backsplash 13. A broiling and baking oven cavity 14 is defined in the upper right-hand portion of the body 11 by a metal oven liner, not shown, which oven cavity 14 is provided with a door 15 that is hinged adjacent to the lower edge thereof and movable between open and closed positions. In the upper portion of the oven cavity 14, a first removable frame, not shown, is provided that supports first and second electric heating elements 16 and 17 in a substantially horizontal and coplanar position and in inner and outer relation with respect to each other; and in the lower portion of the oven cavity 14, a second removable frame, not shown, is provided that supports a third electric heating element 18 in a substantially horizontal position. The heating elements 16, 17 and 18 may be the open resistance coil type and are arranged upon the respective upper and lower frames in the general manner disclosed in U. S. Patent No. 2,498,583, granted on February 21, 1950, to Herman W. Schulze, the electric heating elements being suitably electrically insulated from the associated supporting frames.

The circuit network that is provided for the purpose of selectively controlling the electric heating elements 16, 17 and 18 comprises a manual control switch 19 mounted upon the backsplash 13 that is preferably of the pushbutton type and of the general construction disclosed in U. S. Patent No. 2,431,904, granted on December 2, 1947, to John L. Andrews. Specifically the control switch 19 of the pushbutton type includes four individual manually operable pushbuttons respectively corresponding to the off, broil, regular bake and time bake positions thereof. In passing, it is noted that the control switch 19 is so constructed and arranged that as any one of its pushbuttons is manually actuated into its in position, the last-actuated one of its pushbuttons is returned to its out position, and the control switch is set into its control position corresponding to the presently actuated one of its pushbuttons. Also the backsplash 13 carries a thermostatic switch 20 that is provided with a manually operable control dial 21, as well as a timer switch 22 that is provided with a clock face 23, a manually settable on knob 24 and a manually settable off knob 25. Further the backsplash 13 carries a thermostatic switch pilot lamp 26, a control switch pilot lamp 27, and a number of other pushbutton switches 28 for controlling the surface units, not shown, that are also carried by the cooking top 12.

Referring now more particularly to Fig. 2 of the drawings, it is pointed out that the thermostatic switch 20 further comprises a thermal responsive element 30 arranged within the oven cavity 14 and responsive to the temperature therein, as well as a connecting capillary tube 31. The thermostatic switch 20 is of the single-pole single-throw type including the single contact bridging member 32. It will be understood that the thermostatic switch 20 may be selectively set to maintain any predetermined temperature within the oven cavity 14 by proper manipulation of the control dial 21. Specifically, in the thermostatic switch 20, the bridging member 32 normally bridges or closes the associated pair of contacts and is operated to open the associated pair of contacts in response to an influence upon the thermal responsive element 30 indicating that the temperature within the oven cavity 14 has reached the temperature previously set by the control dial 21.

Preferably the timer switch 22 is of the general construction of that disclosed in U. S. Patent No. 1,522,988, granted on January 13, 1925, to Henry E. Warren, and comprises a synchronous electric motor 39 of the "Telechron" type, as well as a pair of contact bridging members 41 and 42. The bridging members 41 and 42 normally occupy open positions with respect to the associated pairs of contacts, and are later operated into closed positions with respect to the associated pairs of contacts, at a first preset clock time governed by the on control knob 24, and are still later operated back into their open positions with respect to the associated pairs of contacts, at a second preset clock time governed by the off control knob 25. For example, in the timer switch 22, the on control knob 24 may be set to a first predetermined clock time, such, for example, as 5 o'clock, and the off control knob 25 may be set to a second predetermined clock time, such, for example, as 6 o'clock; whereby the timer switch 22 effects the selective controls noted of the bridging members 41 and 42 at the two previously set clock times so that a baking operation is carried out in a manner more fully explained hereinafter in the oven cavity 14 from 5 o'clock to 6 o'clock.

The manual control switch 19 of the pushbutton type further comprises five incoming terminals 51, 52, 53, 54 and 55, five outgoing terminals 61, 62, 63, 64 and 65, and five individual switch blades 71, 72, 73, 74 and 75, as best shown in Figs. 3, 4 and 5. The individual switch blades 71, etc. are adapted to complete connections between the corresponding individual incoming terminals 51, etc., and the corresponding individual outgoing terminals 61, etc., in the different positions of the control switch 19, as explained more fully hereinafter. Also in the control switch 19, the incoming terminals 51 and 52 are permanently strapped, the incoming terminals 53 and 54 are permanently strapped, and the outgoing terminals 64 and 65 are permanently strapped.

Further, the circuit network comprises a bus 81 commonly connecting together the inside terminals of the heating elements 16, 17 and 18, a bus 82 terminated by the outgoing terminal 61, a bus 83 terminated by the outgoing terminal 62, a bus 84 terminated by the outgoing terminal 63 and connected to the outside terminal of the heating element 16, a bus 85 commonly terminated by the outgoing terminals 64 and 65 and connected to the outside terminal of the heating element 18, and a bus 87 terminated by the incoming terminal 55. Further, the circuit network comprises a three-wire Edison source of current supply of 236 volts, single-phase A. C. that includes first and second outside lines 91 and 92 and a grounded neutral line 93. The outside line 91 is commonly connected to the incoming terminals 51 and 52; the outside line 92 is commonly connected to the incoming terminals 53 and 54; and the neutral line 93 is connected to the outside terminal of the heating element 17. The contacts controlled by the bridging member 32 are respectively connected to the busses 81 and 83; the contacts controlled by the bridging member 41 are respectively connected to the busses 83 and 82; and the contacts controlled by the bridging member 42 are respectively connected to the bus 87 and the outside line 92. The winding of the electric motor 39 is connected across the outside line 92 and the neutral line 93; the thermostatic switch pilot lamp 26 is connected across the neutral line 93 and the bus 81; and the control switch pilot lamp 27 is connected across the neutral line 93 and the bus 82.

In the arrangement: the heating element 16 may have a resistance of 17.4 ohms, developing a wattage of 3200 watts at 236 volts; the heating element 17 may have a resistance of 17.4 ohms, developing a wattage of 800 watts at 118 volts; the heating element 18 may have a resistance of 18.6 ohms, developing a wattage of 3000 watts at 236 volts.

Considering now the operation of the circuit control network of Figs. 2 to 5, inclusive, in conjunction with the control of the heating elements 16, 17 and 18, it is noted that when the off pushbutton of the control switch 19 is actuated, the five incoming terminals 51 to 55, inclusive, are respectively disconnected from the five outgoing terminals 61 to 65, inclusive, as indicated in Fig. 2; whereby the heating elements 16, 17 and 18 are de-energized, as shown in broken lines in Fig. 2. Also at this time it may be assumed that the oven cavity 14 is cold so that the thermostatic switch 20 operates the bridging member 32 to close the associated pair of contacts. Further, it may be assumed that the timer switch 22 is operating for clock purposes, but that neither of the control knobs 24 or 25 is set. At this time, the thermostatic switch pilot lamp 27 and the control switch pilot lamp 28 are extinguished.

Now assuming that the cook wishes to perform a broiling operation, she merely operates the broil pushbutton of the control switch 19 setting the circuit elements into the condition shown in Fig. 3; whereby the incoming terminals 51, 52 and 53 are respectively connected to the outgoing terminals 61, 62 and 63 by the respective switch blades 71, 72 and 73. When the control switch 19 is thus operated into its broil position, the heating element 16 is energized across the outside lines 91 and 92 via a circuit including the busses 83, 81 and 84, as well as the bridging member 32; and the heating element 17 is energized across the outside line 91 and the neutral line 93 via a circuit including the busses 83 and 81, as well as the bridging member 32. Accordingly, the heating element 16 develops its full rated wattage of approximately 3200 watts; and the heating element 17 develops its full rated wattage of approximately 800 watts. Thus in the broil position of the control switch 19, the total 4000 watts is developed in the upper portion of the oven cavity 14, which is desirable for broiling purposes.

Normally when a broiling operation is to be carried out in the oven cavity 14, the control dial 21 of the thermostatic switch 20 is set up to its maximum temperature position and the door 15 is set ajar or cracked to ventilate the oven cavity 14; whereby the thermostatic switch 20 ordinarily exercises no control during the broiling operation. Also at this time the thermostatic switch pilot lamp 26 is illuminated between the bus 81 and the neutral line 93 in order to indicate that the bridging member 32 of the thermostatic switch 20 occupies its closed position with respect to the associated pair of contacts; and the control switch pilot lamp 27 is illuminated between the neutral line 93 and the bus 82 in order to indicate that the control switch 19 occupies other than its off position.

Now assuming that the cook wishes to perform a regular baking operation, she first sets the control dial 21 to the temperature that is desired in the oven cavity 14, and merely operates the regular bake pushbutton of the control switch 19 setting the circuit elements into the condition shown in Fig. 4; whereby the incoming terminals 51, 52 and 54 are respectively connected to the outgoing terminals 61, 62 and 64 by the respective switch blades 71, 72 and 74. When the control switch 19 is thus operated into its regular bake position, the heating element 18 is energized across the outside lines 91 and 92 via the busses 83, 81 and 85 and the contact bridging member 32 of the thermostatic switch 20; and the heating element 17 is energized across the outside lines 91 and the neutral line 93 via the busses 83 and 81 and the contact bridging member 32 of the thermostatic switch 20. Accordingly, the heating element 18 develops its full rated wattage of approximately 3000 watts; while the heating element 17 develops its full rated wattage of approximately 800 watts. Thus in the regular bake position of the control switch 19, when the contact bridging member 32 is closed, the total wattage developed in the oven cavity 14 is approximately 3800 watts; however, about 3000 watts of this total wattage is developed by the heating element 18 so that a disproportionate amount of heat is produced in the lower portion of the oven cavity 14, which is necessary in order that a substantially uniform distribution of the heat be effected throughout the oven cavity 14, which is desirable for regular baking purposes.

During the carrying out of the regular baking operation in the oven cavity 14, when the temperature therein reaches the temperature previously set by the control dial 21 of the thermostatic switch 20, the temperature responsive element 30 is suitably influenced in order to govern the thermostatic switch 20 so that the bridging member 32 is operated to open the above-traced primary parallel circuits for energizing the heating elements 17 and 18, whereby the heating elements 17 and 18 are energized in series relation across the outside line 92 and the neutral line 93 via the busses 85 and 81. Accordingly, the heating element 17 develops only a small wattage of approximately 185 watts and the heating element 18 develops only a small wattage of approximately 200 watts. Thus in the regular bake position of the control switch 19, when the contact bridging member 32 is open, the total wattage developed in the oven cavity 14 is approximately 385 watts; however, about 200 watts of this total wattage is developed by the heating element 18 so that a disproportionate amount of heat is produced in the lower portion of the oven cavity 14, which is necessary in order that a substantially uniform retention of the heat be effected throughout the oven cavity 14, which is desirable for regular baking purposes.

The temperature within the oven cavity 14 gradually subsides, and when it reaches a temperature slightly below that previously set by the control dial 21 of the thermostatic switch 20, the temperature responsive element 30 is suitably influenced in order to govern the thermostatic switch 20 so that the bridging member 32 is operated to interrupt the above-traced secondary series circuit for energizing the heating elements 17 and 18 and to reclose the above-traced primary parallel circuits for energizing the heating elements 17 and 18. As the regular baking operation is continued, the thermostatic switch 20 operates in the manner described above to hold the previously set temperature in the oven cavity 14. During the regular baking operation the thermostatic switch pilot lamp 26 is illuminated only when the bridging member 32 of the thermostatic switch 20 occupies its closed position with respect to the associated pair of contacts, producing a corresponding indication; and the control switch pilot lamp 27 is illuminated in order to indicate that the control switch 19 occupies other than its off position.

Finally assuming that the cook wishes to perform a time baking operation, she first sets the control dial 21 to the temperature that is desired in the oven cavity 14, and then sets the time during which the time baking operation is desired upon the timer switch 22. Specifically, the on control knob 24 is set at the clock-time it is wished to initiate the baking operation, such, for example, as 5:00 o'clock; and the off control knob 25 is set to the clock-time at which it is wished to arrest the baking operation, such, for example, as 6:00 o'clock. Then the cook operates the time bake pushbutton of the control switch 19 setting the circuit elements into the condition shown in Fig. 5; whereby the incoming terminals 51 and 55 are respectively connected to the outgoing terminals 61 and 65 by the respective switch blades 71 and 75. When the control switch 19 is thus operated into its time bake position, a circuit is prepared for energizing the heating element 18 across the outside lines 91 and 92, which circuit is open at this time at the two contact bridging members 41 and 42 of the timer switch 22; and a circuit is prepared for energizing the heating element 17 across the outside line 91 and the neutral line 93, which circuit is open at this time at the contact bridging member 41 of the timer switch 22.

Thus at this time while the timer switch 22 occupies its open position, there is no potential upon the heating elements 16, 17 and 18; and accordingly, there is no shock hazard to the cook should she inadvertently touch any one of the heating elements 16, 17 or 18 while she is also in contact with the metal liner of the oven cavity 14 or the metal body 11 of the range 10. This consideration is of fundamental importance only with respect to the upper heating elements 16 and 17 that are exposed directly in the top of the oven cavity 14, since the heat distributing shield or baffle normally associated with the lower heating element 18 in the bottom of the oven cavity 14 prevents contact by the cook with the lower heating element 18. In other words, the shock hazard mentioned is really with respect to the upper heating elements 16 and 17; which shock hazard is prevented in the present arrangement.

Continuing now with the time baking operation, when the clock 23 of the timer switch 22 reaches the 5:00 o'clock position set by the on control knob 24, the bridging members 41 and 42 are operated into their closed positions with respect to the associated pairs of contacts completing the circuits for energizing the heating elements 17 and 18. The circuit for energizing the heating element 17 extends from the outside line 91 via the switch blade 71, the bus 82, the contact bridging member 41, the bus 83, the contact bridging member 32, the bus 81 and the heating element 17 to the neutral line 93; while the circuit for energizing the heating element 18 extends from the outside line 91 via the switch blade 71, the bus 82, the contact bridging member 41, the bus 83, the contact bridging member 41, the bus 83, the contact bridging member 32, the bus 81, the heating element 18, the bus 85, the switch blade 75, the bus 87 and the contact bridging member 42 to the outside line 92. Accordingly, at this time the heating elements 17 and 18 respectively develop the full rated wattages of approximately 925 watts and approximately 2000 watts previously mentioned in conjunction with the regular baking operation.

The time baking operation proceeds in a manner identical to that of the regular baking operation previously described, under the control of the thermostatic switch 20 and until the clock 23 reaches the 6:00 o'clock position set by the off control knob 25; whereupon the contact bridging members 41 and 42 are operated back into their normal open positions with respect to the associated pairs of contacts, thereby interrupting the previously traced circuits for energizing the heating elements 17 and 18. Again it will be observed that when the contact bridging members 41 and 42 of the timer switch 22 are returned into their open positions with respect to the associated pairs of contacts, all potentials are removed from the heating elements 16, 17 and 18 in order again to eliminate any shock hazard to the cook should she inadvertently touch any one of the heating elements noted while she is also in contact with the metal liner of the oven cavity 14. At this time, the time baking operation has been completed. In the time baking operation the control of the thermostatic switch pilot lamp 26 and the control of the control switch pilot lamp 27 are the same as described in conjunction with the regular baking operation.

Referring now to Figs. 6 to 9, inclusive, of the drawings, the modified form of the control circuit for the electric range 10 there illustrated and embodying the features of the present invention is substantially identical to the control circuit therefor previously described in conjunction with Figs. 2 to 5, inclusive, except that the manually operable control switch 119 is of the rotary snap type instead of the pushbutton type. Specifically, in Fig. 6, it will be understood that in the oven cavity 114 the arrangement and disposition of the heating elements 116, 117 and 118 are substantially the same as those previously described; and the thermostatic switch 120, and its elements, as well as the timer switch 122, and its elements, are the same as previously described. Moreover, in the control circuit of Fig. 6, the arrangement of the three-wire Edison source of current supply including the outside lines 191 and 192 and the grounded neutral line 193 is the same as that previously described.

More particularly, the manually operable control switch 119 of the rotary snap type is preferably of the general construction and arrangement of that disclosed in U. S. Patent No. 2,203,236, granted on June 4, 1940, to Charles P. Randolph et al.; and, of course, it will be understood that the control switch 119 is mounted upon the backsplash 13 of the electric range 10 in the usual manner. Specifically, the control switch 119 of the rotary snap type includes a single rotary operating knob 119a manually operable into corresponding off, broil, regular bake and time bake positions, the control switch 119 including six incoming terminals 151 to 156, inclusive, six outgoing terminals 161 to 166, inclusive, and six individual switch blades 171 to 176, inclusive, as best shown in Figs. 7, 8 and 9. The individual switch blades 171, etc., are adapted to complete connections between the corresponding individual incoming terminals 151, etc., and the corresponding individual outgoing terminals 161, etc., in the different positions of the control switch 119, as explained more fully hereinafter. In the control switch 119, the incoming terminals 151 and 152 are permanently strapped, the incoming terminals 153 and 155 and the outgoing terminal 166 are permanently strapped together, the outgoing terminals 162 and 163 are permanently strapped, and the outgoing terminals 164 and 165 are permanently strapped. When the control switch 119 occupies its off position the incoming terminals 153 and 155 are respectively connected to the outgoing terminals 163 and 165 by the respective switch blades 173 and 175, as illustrated in Fig. 6; when the control switch 119 occupies its broil position, the incoming terminals 152, 155 and 156 are respectively connected to the outgoing terminals 162, 165, and 166 by the respective switch blades 172, 175 and 176, as illustrated in Fig. 7; when the control switch 119 occupies its regular bake position, the incoming terminals 151, 153, 155 and 156 are respectively connected to the outgoing terminals 161, 163, 165 and 166 by the respective switch blades 171, 173, 175 and 176, as illustrated in Fig. 8; and when the control switch 119 occupies its time bake position, the incoming terminals 151, 153 and 154 are respectively connected to the outgoing terminals 161, 163, 164 by the respective switch blades 171, 173 and 174, as illustrated in Fig. 9.

As illustrated in Fig. 6, the inside terminals of the heating elements 116 and 117 are commonly connected to a bus 181; the outside terminals of the heating elements 116 and 117 are respectively connected to a bus 182 and to the neutral line 193; and the inside and outside terminals of the heating element 118 are respectively connected to two busses 184 and 185. The commonly connected incoming terminals 151 and 152 are connected to the outside line conductor 192; the commonly connected incoming terminals 153 and 155 and the outgoing terminal 166 are connected to the bus 182; the incoming terminal 154 is connected to a bus 186; the incoming terminal 156 is connected to a bus 187; the outgoing terminal 161 is connected to the bus 184; the commonly connected outgoing terminals 162 and 163 are connected to the bus 181; and the commonly connected outgoing terminals 164 and 165 are connected to the bus 185. The contacts of the pair controlled by the bridging member 141 are respectively connected to the busses 186 and 187; the contacts of the pair controlled by the bridging member 142 are respectively connected to the busses 185 and 182; and the contacts of the pair controlled by the bridging member 132 are respectively connected to the bus 187 and the outside line 191.

Accordingly, when the control switch 119 occupies its off position, all of the circuits for the heating elements 116, 117 and 118 are open.

When the control switch 119 occupies its broil position, a circuit is completed for energizing the heating element 116 across the outside lines 191 and 192, and a circuit is completed for energizing the heating element 117 across the outside line 192 and the neutral line 193. The circuit for energizing the heating element 116 extends from the outside line 192 via the switch blade 172, the bus 181, the heating element 116, the bus 182, the switch blade 176, the bus 187 and the contact bridging member 132 to the outside line 191; while the circuit for energizing the heating element 117 extends from the outside line 192 via the switch blade 172, the bus 181 and the heating element 117 to the neutral line 193. In the broiling operation, the dial 121 of the thermostatic switch 120 is normally set at a sufficently high temperature so that the heat responsive element 130 does not selectively control the bridging member 132 of the thermostatic switch 120, the oven door 15 being set ajar or cracked, as previously noted.

When the control switch 119 occupies its regular bake position and the contact bridging member 132 occupies its closed position, a circuit is completed for energizing the heating element 118 across the outside lines 191 and 192, and a circuit is completed for energizing the heating element 117 across the outside line 191 and the neutral line 193. The circuit for energizing the heating element 118 extends from the outside line 192 via the switch blade 171, the bus 184, the heating element 118, the bus 185, the switch blade 175, the bus 182, the switch blade 176, the bus 187 and the bridging member 132 to the outside line 191; while the circuit for energizing the heating element 117 extends from the outside line 191 via the bridging member 132, the bus 187, the switch blade 176, the bus 182, the switch blade 173, the bus 181 and the heating element 117 to the neutral line 193. In the regular baking operation, the dial 121 of the thermostatic switch 120 is set to the temperature that is desired in the oven cavity 114; whereby the heat responsive element 130 selectively controls the thermostatic switch 120 to cause the bridging member 132 to be moved selectively into its open and closed positions opening and closing the circuits for energizing the heating elements 117 and 118 for the purpose of maintaining the desired temperature within the oven cavity 114, in the manner previously explained.

Specifically, when the contact bridging member 132 occupies its open position, the above-traced primary parallel circuits for energizing the heating elements 117 and 118 are interrupted whereby the heating elements 117 and 118 are energized in series relation across the outside line 192 and the neutral line 193; this secondary series circuit extending from the outside line 192 via the switch blade 171, the bus 184, the heating element 118, the bus 185, the switch blade 175, the bus 182, the switch blade 173, the bus 181 and the heating element 117 to the neutral line 193.

When the control switch 119 occupies its time bake position, a primary circuit is prepared for energizing the heating element 118 across the outside lines 191 and 192, a primary circuit is prepared for energizing the heating element 117 across the outside line 191 and the neutral line 193, and a secondary circuit is prepared for energizing the heating elements 117 and 118 in series relation across the outside line 192 and the neutral line 193; which circuits are not only under the control of the thermostatic switch 120, but are also under the control of the timer switch 122. More particularly, the timer switch 122 closes the circuits mentioned at the set on clock time and subsequently opens the circuits mentioned at the set off clock time; while the thermostatic switch 120 selectively opens and closes the circuits mentioned for the purpose of holding the previously set temperature in the oven cavity 114. More particularly, when the control switch 119 occupies its time bake position, the primary circuit for energizing the heating element 118 extends, when completed, from the outside line 192 via the switch blade 171, the bus 184, the heating element 118, the bus 185, the switch blade 174, the bus 186, the bridging member 141, the bus 187 and the bridging member 132 to the outside line 191; the primary circuit for energizing the heating element 117 extends, when completed, from the outside line 191 via the bridging member 132, the bus 187, the bridging member 141, the bus 186, the switch blade 174, the bus 185, the bridging member 142, the bus 182, the switch blade 173, the bus 181 and the heating element 117 to the neutral line 193; and the secondary circuit for energizing the heating elements 117 and 118 in series relation extends, when completed, from the outside line 192 via the switch blade 171, the bus 184, the heating element 118, the bus 185, the bridging member 142, the bus 182, the switch blade 173, the bus 181 and the heating element 117 to the neutral line 193.

It is noted that when the control switch 119 occupies its time bake position and the contact bridging members 141 and 142 of the timer switch 122 occupy their open positions with respect to the associated pairs of contacts, no potentials are present upon the upper heating elements 116 and 117, thereby eliminating any shock hazard to the cook should she inadvertently touch either one of the heating elements noted while she is also in contact with the metal liner of the oven cavity 114.

Referring now to Figs. 10 to 13, inclusive, of the drawings, the modified form of the control circuit for the electric range 10 there illustrated and embodying the features of the present invention is substantially identical to the control circuit therefor previously described in conjunction with Figs. 2 to 5, inclusive, except that a single heating element 217 is arranged in the upper portion of the oven cavity 214; and in this embodiment the upper and lower heating elements 217 and 218 may be conveniently formed of the metal sheathed resistance conductor type. Moreover, in the control circuit of Fig. 10, the arrangement of the thermostatic switch 220, the timer switch 222 and the three-wire Edison source of current supply are the same as previously described.

In this case the heating element 217 may have a resistance of 15.1 ohms developing 3700 watts when energized with 236 volts in the broil position of the control switch 219 and developing 925 watts when energized with 118 volts in the regular bake position of the control switch 219 with the thermostatic switch 220 in its closed position; and the heating element 218 may have a resistance of 27.9 ohms developing 2000 watts when energized with 236 volts in the regular bake position of the control switch 219 with the thermostatic switch 220 in its closed position. Now in the regular bake position of the control switch 219, when the thermostatic switch 220 is operated into its open position, the heating elements 217 and 218 are energized in series relation with 118 volts, whereby they respectively develop 115 watts and 215 watts, a total wattage of 330 watts, for the purpose previously explained. Finally, in the time bake position of the control switch 219, the operation of this control circuit is the same as the operation thereof in the regular bake position of the control switch 219, except that the timer switch 222 is rendered operative to exercise its time control in a manner substantially identical to that previously described and for the purpose previously explained.

In the interest of brevity the circuits are not traced in the different positions of the control switch 219, but they are fully illustrated in Figs. 10 to 13, inclusive, and are quite similar to those described in detail in conjunction with Figs. 2 to 5, inclusive, and entirely analagous thereto.

In a series of laboratory tests involving a number of electric ranges of the home appliance type incorporating electric ovens provided with control circuits of the character described, and embodying the present invention, it was discovered that the amplitude of temperature variation in the oven cavities in baking operations was reduced from 15 to 20% with respect to identical ovens provided with conventional control circuits. Moreover, the normal departure between the amplitude of the temperature variation of the oven cavity and that of the thermal element of the thermostatic switch was substantially eliminated. Specifically in the baking operations carried out in the inventive oven, the amplitude of the temperature variation of the center of the oven cavity was 22° F., while that of the bulb of the thermostatic switch was 23° F.; on the other hand, in identical baking operations carried out in the conventional oven, the amplitude of the temperature variation of the center of the oven cavity was 33° F., while that of the bulb of the thermostatic switch was 19° F. These comparative tests clearly demonstrate that in the inventive oven, the input of the small wattage (about 10% of full wattage) in the baking operation reduces drastically the crests and troughs in the temperature curve of the oven performance.

Moreover, in actual kitchen tests of these inventive ovens, utilizing the "Nema" cake baking test, much improved results were obtained with respect to texture and proper moisture-content in the products. This resulted directly from the low level of input wattage in the baking operation, with the corresponding reduction of the "radiation effect," thereby eliminating the normal "too much top heat" complaint of cake bakers using conventional electric ovens.

Finally, it is noted that the simplification of the thermostatic switch in the inventive oven control circuit (single-pole, single-throw) with respect to that employed in a conventional oven, not only contributes substantially to economy in manufacture, but also insures positive and trouble-free operation.

In view of the foregoing, it is apparent that there has been provided an improved control circuit for an electric broiling and baking oven that is efficient in operation, simple in action, and safe in use.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electric oven comprising first and second electric heating elements respectively disposed adjacent to the top and adjacent to the bottom of said oven, said first heating element having a resistance somewhat lower than that of said second heating element, a three-wire Edison electric current supply source provided with first and second outside lines and a neutral line, a first supply connection for energizing said first heating element across said first outside line and said neutral line, a second supply connection for energizing said second heating element across said first and second outside lines, a third supply connection for energizing said first and second heating elements in series relation across said second outside line and said neutral line, a unitary control switch having off and bake positions, said control switch being operative into its off position to interrupt said first and second and third supply connections and operative into its bake position to prepare said first and second and third supply connections, and a thermostatic switch provided with a thermal element operatively associated with said oven and responsive to the temperature therein and having cold and hot positions, said thermostatic switch being operative into its cold position to complete said first and second prepared supply connections and to interrupt said third prepared supply connection in the bake position of said control switch, said thermostatic switch being operative into its hot position to interrupt said first and second prepared supply connections and to complete said third prepared supply connection in the bake position of said control switch, whereby the amplitude of the temperature variation in said oven closely follows that of the thermal element of said thermostatic switch in the bake position of said control switch.

2. The electric oven combination set forth in claim 1, wherein said first and second and third supply connections include a common point constituting a junction between said first and second heating elements, said thermostatic switch in operating into its cold position completes said first and second supply connections and interrupts said third supply connection by connecting said first outside line to said junction and said thermostatic switch in operating into its hot position interrupts said first and second supply connections and completes said third supply connection by disconnecting said first outside line from said junction.

3. The electric oven combination set forth in claim 2, wherein said thermostatic switch is of the single-pole single-throw type.

4. The electric oven combination set forth in claim 1, wherein the wattage developed by said first heating element is about one-half of the wattage developed by said second heating element when said first and second supply connections are completed, and the combined wattage developed by said first and second heating elements when said third supply connection is completed is only about 10% of the combined wattage developed by said first and second heating elements when said first and second supply connections are completed.

5. The electric oven combination set forth in claim 1, wherein the wattage developed by said first heating element is about 10X watts when said first supply connection is completed, the wattage developed by said second heating element is about 20X watts when said second supply connection is completed, the wattage developed by said first heating element is about X watts when said third supply connection is completed, and the wattage developed by said second heating element is about 2X watts when said third supply connection is completed, wherein X is a number having a value appropriate with respect to the volume of said oven.

6. An electric oven comprising first and second electric heating elements respectively disposed adjacent to the top and adjacent to the bottom of said oven, said first heating element having a resistance somewhat lower than that of said second heating element, a three-wire Edison electric current supply source provided with first and second outside lines and a neutral line, a first circuit for connecting said first heating element across said first outside line and said neutral line, a second circuit for connecting said second heating element across said first and second outside lines, a third circuit for connecting said first and second heating elements in series relation across said second outside line and said neutral line, a unitary control switch having off and bake positions, said control switch being operative into its off position to interrupt said first and second and third circuits and operative into its bake position to prepare said first and second and third circuits, a time switch having open and closed positions, said time switch being operative into its open position to interrupt said first and second and third circuits and operative into its closed position to prepare said first and second and third circuits, clock mechanism selectively settable to an on clock time and to an off clock time and operative at said set on clock time to operate said time switch from its open position into its closed position and operative at said set off clock time to operate said time switch from its closed position into its open position, and a thermostatic switch provided with a thermal element operatively associated with said oven and responsive to the temperature therein and having cold and hot positions, said thermostatic switch being operative into its cold position to prepare said first and second circuits and to interrupt said third circuit and operative into its hot position to interrupt said first and second circuits and to prepare said third circuit, said first and second circuits being completed by the conjoint operation of said control switch into its bake position and operation of said time switch into its closed position and operation of said thermostatic switch into its cold position, and said third circuit being completed by the conjoint operation of said control switch into its bake position and operation of said time switch into its closed position and operation of said thermostatic switch into its hot position, whereby the amplitude of the temperature variation in said oven closely follows that of the thermal element of said thermostatic switch in the bake position of said control switch when said time switch occupies its closed position.

7. An electric oven comprising first and second electric heating elements respectively disposed adjacent to the top and adjacent to the bottom of said oven, said first heating element having a resistance somewhat lower than that of said second heating element, a three-wire Edison electric current supply source provided with first and second outside lines and a neutral line, first and second circuits for connecting said first heating element across said first outside line and said neutral line, third and fourth circuits for connecting said second heating element across said first and second outside lines, fifth and sixth circuits for connecting said first and second heating elements in series relation across said second outside line and said neutral line, a unitary control switch having off and regular bake and time bake positions, said control switch being operative into its off position to interrupt each of said circuits and operative into its regular bake position to prepare said first and third and fifth circuits and operative into its time bake position to prepare said second and fourth and sixth circuits, a time switch having open and closed positions, said time switch being operative into its open position to interrupt said second and fourth and sixth circuits and operative into its closed positions to prepare said second and fourth and sixth circuits, clock mechanism selectively settable to an on clock time and to an off clock time and operative at said set on clock time to operate said time switch from its open position into its closed position and operative at said set off clock time to operate said time switch from its closed position into its open position, and a thermostatic switch provided with a thermal element operatively associated with said oven and responsive to the temperature therein and having cold and hot positions, said thermostatic switch being operative into its cold position to prepare said first and second and third and fourth circuits and to interrupt said fifth and sixth circuits and operative into its hot position to interrupt said first and second and third and fourth circuits and to prepare said fifth and sixth circuits, said first and third circuits being completed by the conjoint operation of said control switch into its regular bake position and operation of said thermostatic switch into its cold position, said fifth circuit being completed by the conjoint operation of said control switch into its regular bake position and operation of said thermostatic switch into its hot position, said second and fourth circuits being completed by the conjoint operation of said control switch into its time bake position and operation of said time switch into its closed position and operation of said thermostatic switch into its cold position, and said sixth circuit being completed by the conjoint operation of said control switch into its time bake position and operation of said time switch into its closed position and operation of said thermostatic switch into its hot position, whereby the amplitude of the temperature variation in said oven closely follows that of the thermal element of said thermostatic switch in the regular bake position of said control switch and also in the time bake position of said control switch when said time switch occupies its closed position.

8. An electric oven comprising first and second electric heating elements disposed adjacent to the top of said oven, a third electric heating element disposed adjacent to the bottom of said oven, said first heating element having a resistance somewhat higher than that of said second heating element and said third heating element having a resistance somewhat higher than that of said first heating element, a three-wire Edison electric current supply source provided with first and second outside lines and a neutral line, a first circuit for connecting said first heating element across said first and second outside lines, a second circuit for connecting said second heating element across said first outside line and said neutral line, a third circuit for connecting said third heating element across said first and second outside lines, a fourth circuit for connecting said second and third heating elements in series relation across said second outside line and said neutral line, a unitary control switch having off and broil and bake positions, said control switch being operative into its off position to interrupt said first and second and third and fourth circuits and operative into its broil position to complete said first and second circuits and operative into its bake position to prepare said second and third and fourth circuits, and a thermostatic switch provided with a thermal element operatively associated with said oven and responsive to the temperature therein and having cold and hot positions, said thermostatic switch being operative into its cold position to complete said second and third prepared circuits and to interrupt said fourth prepared circuit in the bake position of said control switch, said thermostatic switch being operative into its hot position to interrupt said second and third prepared circuits and to complete said fourth prepared circuit in the bake position of said control switch, whereby the amplitude of the temperature variation in said oven closely follows that of the thermal element of said thermostatic switch in the bake position of said control switch.

9. The electric oven combination set forth in claim 1, wherein the wattage developed by said first heating element is about one-fourth of the wattage developed by said second heating element when said first and second supply connections are completed, and the combined wattage developed by said first and second heating elements when said third supply connection is completed is only about 10% of the combined wattage developed by said first and second heating elements when said first and second supply connections are completed.

10. The electric oven combination set forth in claim 1, wherein the wattage developed by said first heating element is about 4X watts when said first supply connection is completed, the wattage developed by said second heating element is about 15X watts when said second supply connection is completed, the wattage developed by said first heating element is about X watts when said third supply connection is completed, and the wattage developed by said second heating element is about X watts when said third supply connection is completed, wherein X is a number having a value appropriate with respect to the volume of said oven.

References Cited in the file of this patent

UNITED STATES PATENTS

| | | |
|---|---|---|
| 2,203,236 | Randolph et al. | June 4, 1940 |
| 2,515,427 | Schulze | July 18, 1950 |
| 2,654,824 | Schroeder | Oct. 6, 1953 |
| 2,663,786 | Hiam et al. | Dec. 22, 1953 |
| 2,721,926 | Baird | Oct. 25, 1955 |
| 2,742,557 | Macoicz | Apr. 17, 1956 |
| 2,742,558 | Simmons | Apr. 17, 1956 |